US006799802B1

(12) United States Patent
Moran

(10) Patent No.: US 6,799,802 B1
(45) Date of Patent: Oct. 5, 2004

(54) HEAD SUPPORT DEVICE

(76) Inventor: Kathleen M. Moran, 25 Berkshire St., Fitchburg, MA (US) 01420

( * ) Notice: Subject to any disclaimer, the term of this patent is extended or adjusted under 35 U.S.C. 154(b) by 0 days.

(21) Appl. No.: 10/622,942

(22) Filed: Jul. 18, 2003

(51) Int. Cl.$^7$ ................................................ A47C 7/38
(52) U.S. Cl. .............................. 297/393; 2/171; 2/311; 5/637; 602/36
(58) Field of Search ................................ 297/391, 397, 297/393, 464; 2/171, 171.5, 171.6, 172, 311; 5/637; 602/17, 36

(56) References Cited

U.S. PATENT DOCUMENTS

| | | | | |
|---|---|---|---|---|
| 2,726,401 A | * | 12/1955 | Sugel | ............................. 2/171 |
| 2,726,714 A | * | 12/1955 | McAndrews | ................ 297/473 |
| 4,182,322 A | * | 1/1980 | Miller | ............................ 5/637 |
| 4,383,713 A | | 5/1983 | Roston | |
| 4,779,930 A | | 10/1988 | Rosen | |
| D316,792 S | | 5/1991 | Schmitz | |
| 5,261,134 A | | 11/1993 | Matthews | |
| 5,685,016 A | * | 11/1997 | Douglas | ......................... 2/171 |
| 5,979,981 A | | 11/1999 | Dunne et al. | |
| 5,988,752 A | | 11/1999 | Richards | |
| 6,247,181 B1 | * | 6/2001 | Hirsch et al. | ................... 2/171 |
| 6,266,825 B1 | * | 7/2001 | Floyd | .......................... 297/393 |
| 6,607,245 B1 | * | 8/2003 | Scher | .......................... 297/393 |

* cited by examiner

Primary Examiner—Peter R. Brown

(57) ABSTRACT

A head support device for supporting the head of a person in an upright position against the back support of a chair. The head support device includes a flexible panel having a first side and a second side. The panel has a first edge, a second edge, a third edge, and a fourth edge wherein the first and second edges are positioned opposite of each other. The third and fourth edges extend outward in opposite directions at junctures with the first and second edges such that four flaps are defined. A fastening means removably fastens two flaps on the third edge together and the two flaps one the fourth edge together. A securing means removably secures the first side of the panel to the chair.

8 Claims, 5 Drawing Sheets

HEAD SUPPORT DEVICE

BACKGROUND OF THE INVENTION

1. Field of the Invention

The present invention relates to head supports and more particularly pertains to a new head support device for supporting the head of a person in an upright position against the back support of a chair.

2. Description of the Prior Art

The use of head supports is known in the prior art. More specifically, head supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,979,981; 5,988,752; 4,383,713; 5,261,134; 4,779,930; and Des. 316,792.

While these devices fulfill their respective, particular objectives and requirements, the aforementioned patents do not disclose a new head support device. The inventive device includes a flexible panel having a first side and a second side. The panel has a first edge, a second edge, a third edge, and a fourth edge wherein the first and second edges are positioned opposite of each other. The third and fourth edges extend outward at a juncture of the third and fourth edges and the first and second edges such that four flaps are defined. A fastening means removably fastens the first side of one of the flaps on the third edge to the second side of the other of the flaps on the third edge. Another fastening means removably fastens the first side of one of the flaps on the fourth edge to the second side of the other of the flaps on the fourth edge. A securing means removably secures the first side of the panel to a chair.

In these respects, the head support device according to the present invention substantially departs from the conventional concepts and designs of the prior art, and in so doing provides an apparatus primarily developed for the purpose of supporting the head of a person in an upright position against the back support of a chair.

SUMMARY OF THE INVENTION

In view of the foregoing disadvantages inherent in the known types of head supports now present in the prior art, the present invention provides a new head support device construction wherein the same can be utilized for supporting the head of a person in an upright position against the back support of a chair.

The general purpose of the present invention, which will be described subsequently in greater detail, is to provide a new head support device apparatus and method which has many of the advantages of the head supports mentioned heretofore and many novel features that result in a new head support device which is not anticipated, rendered obvious, suggested, or even implied by any of the prior art head supports, either alone or in any combination thereof.

To attain this, the present invention generally comprises a flexible panel having a first side and a second side. The panel has a first edge, a second edge, a third edge, and a fourth edge wherein the first and second edges are positioned opposite of each other. The third and fourth edges extend outward at a juncture of the third and fourth edges and the first and second edges such that four flaps are defined. A fastening means removably fastens the first side of one of the flaps on the third edge to the second side of the other of the flaps on the third edge. Another fastening means removably fastens the first side of one of the flaps on the fourth edge to the second side of the other of the flaps on the fourth edge. A securing means removably secures the first side of the panel to a chair.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new head support device apparatus and method which has many of the advantages of the head supports mentioned heretofore and many novel features that result in a new head support device which is not anticipated, rendered obvious, suggested, or even implied by any of the prior art head supports, either alone or in any combination thereof.

It is another object of the present invention to provide a new head support device which may be easily and efficiently manufactured and marketed.

It is a further object of the present invention to provide a new head support device which is of a durable and reliable construction.

An even further object of the present invention is to provide a new head support device which is susceptible of a low cost of manufacture with regard to both materials and labor, and which accordingly is then susceptible of low prices of sale to the consuming public, thereby making such head support device economically available to the buying public.

Still yet another object of the present invention is to provide a new head support device which provides in the apparatuses and methods of the prior art some of the advantages thereof, while simultaneously overcoming some of the disadvantages normally associated therewith.

Still another object of the present invention is to provide a new head support device for supporting the head of a person in an upright position against the back support of a chair.

Yet another object of the present invention is to provide a new head support device which includes a flexible panel having a first side and a second side. The panel has a first edge, a second edge, a third edge, and a fourth edge wherein the first and second edges are positioned opposite of each other. The third and fourth edges extend outward at a juncture of the third and fourth edges and the first and second edges such that four flaps are defined. A fastening means removably fastens the first side of one of the flaps on the third edge to the second side of the other of the flaps on the third edge. Another fastening means removably fastens the first side of one of the flaps on the fourth edge to the second side of the other of the flaps on the fourth edge. A securing means removably secures the first side of the panel to a chair.

Still yet another object of the present invention is to provide a new head support device that holds up an infant's head against the backrest of a chair to prevent neck strain to the infant should infant fall asleep while in a car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
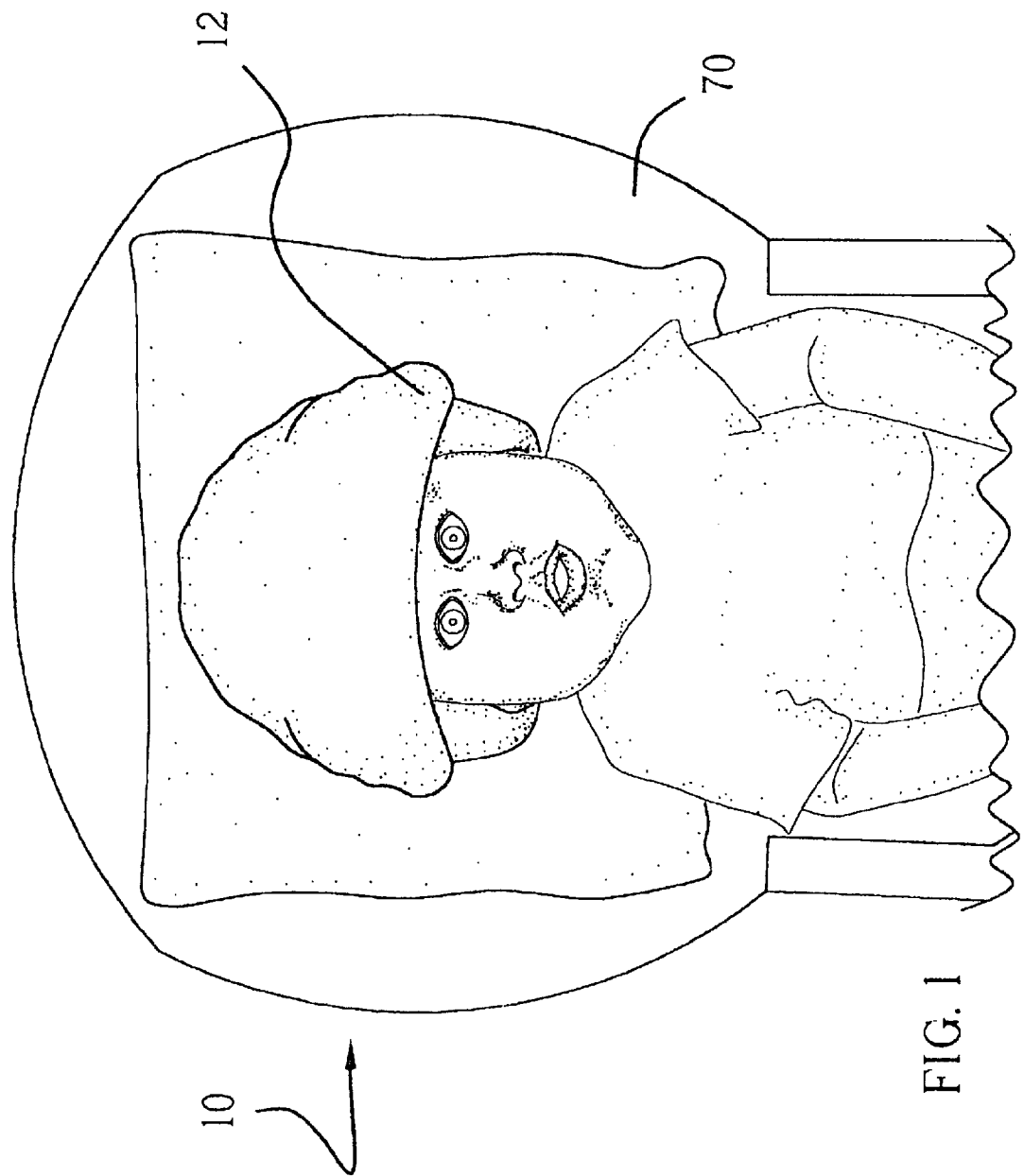
FIG. 1 is a schematic front view of a new head support device according to the present invention.
Figure 2:
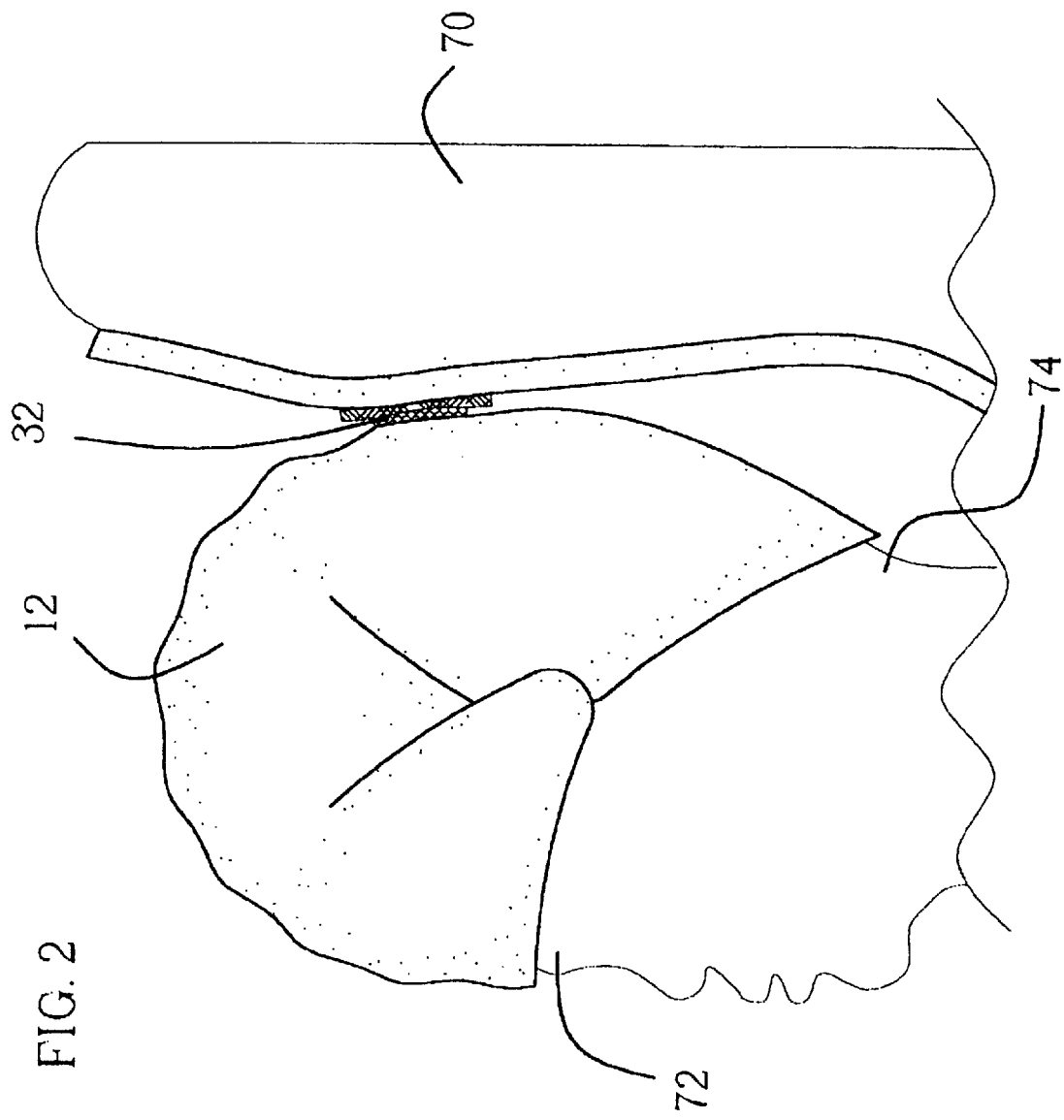
FIG. 2 is a schematic side view of the present invention.
Figure 3:
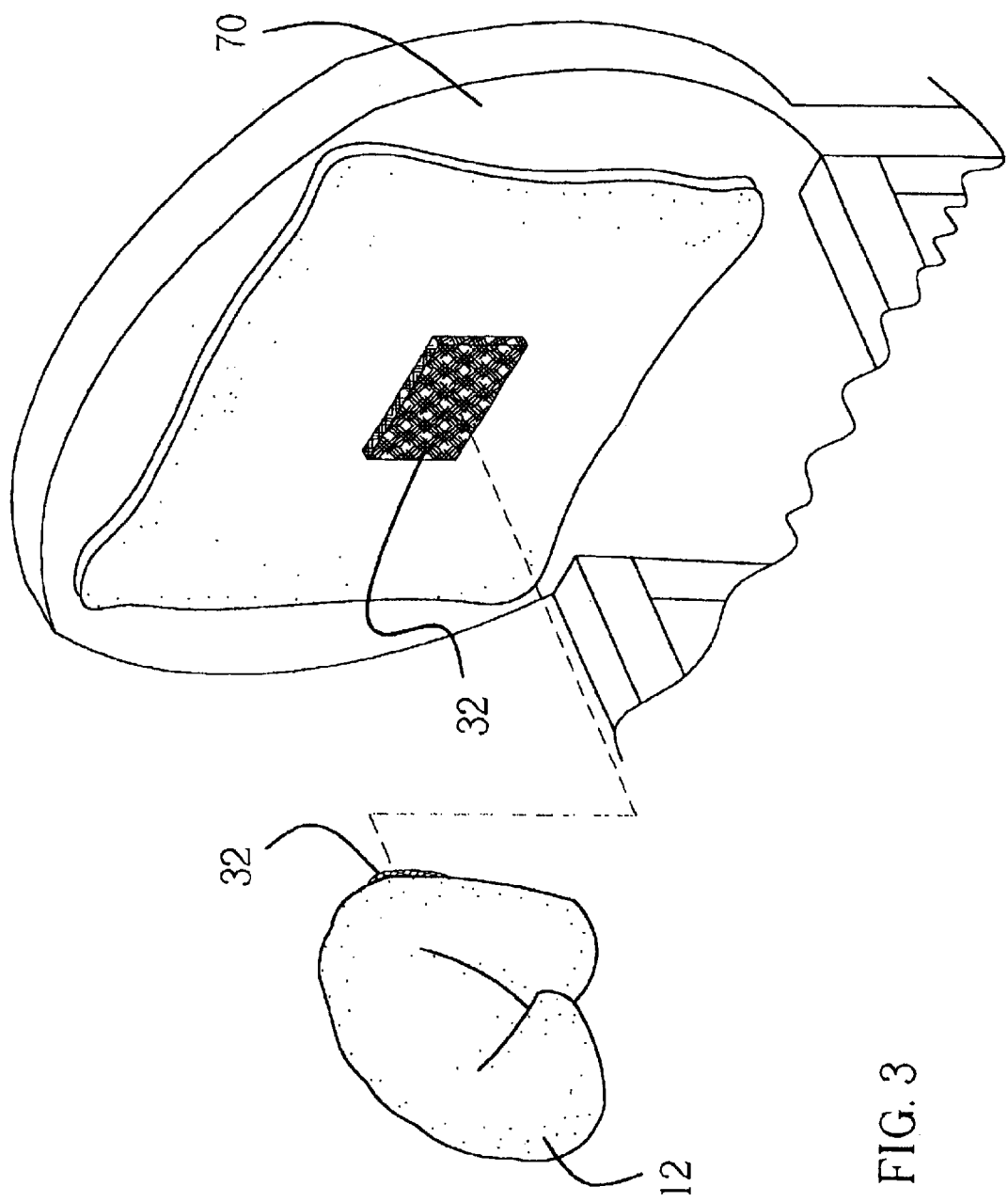
FIG. 3 is a schematic perspective view of the present invention.
Figure 4:
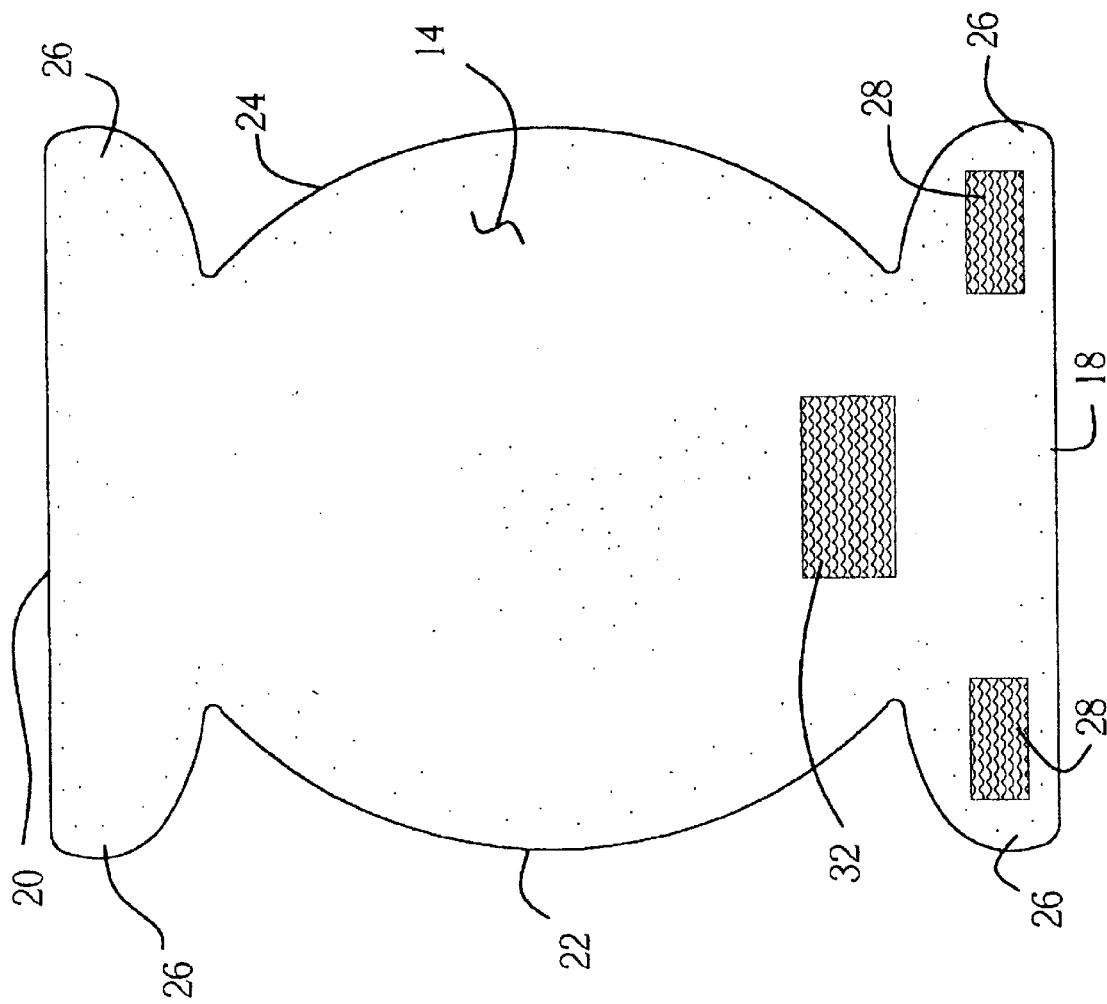
FIG. 4 is a schematic plan view of the first side of the present invention.
Figure 5:
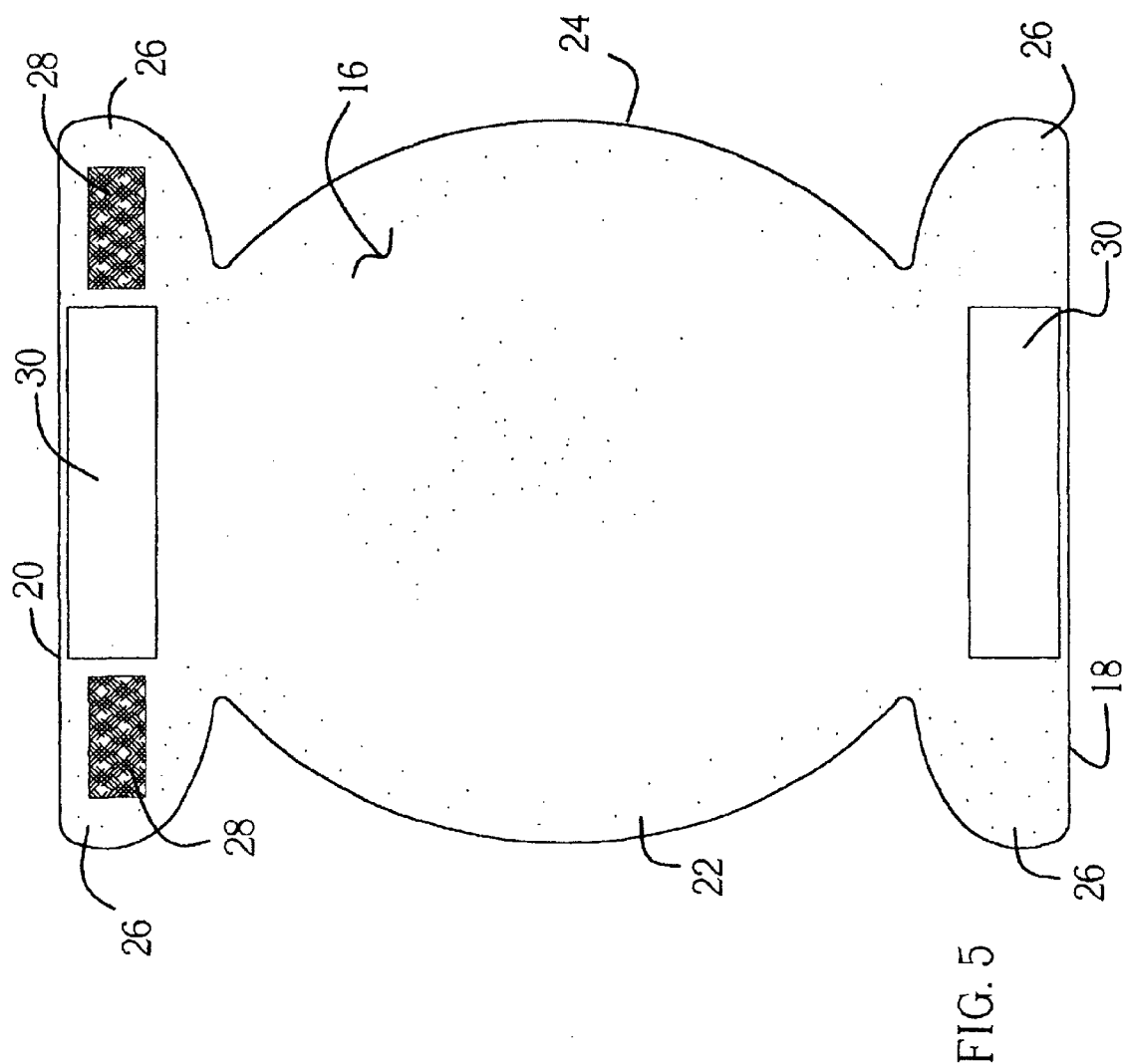
FIG. 5 is a schematic plan view of the second side of the present invention.

With reference now to the drawings, and in particular to FIGS. 1 through 5 thereof, a new head support device embodying the principles and concepts of the present invention and generally designated by the reference numeral 10 will be described.

As best illustrated in FIGS. 1 through 5, the head support device 10 generally comprises a panel 12 having a first side 14 and a second side 16. The panel 12 comprises a flexible material. The panel 12 has a first edge 18, a second edge 20, a third edge 22, and a fourth edge 24 wherein the first 18 and second 20 edges are positioned opposite of each other. The third 22 and fourth 24 edges extend outward at a juncture of the third 22 and fourth 24 edges and the first 18 and second 20 edges such that four flaps 26 are defined. Each of the third 22 and fourth 24 edges are arcuate and extend away from each other. The panel 12 preferably comprises a cloth material.

A fastening means 28 removably fastens the first side 14 of one of the flaps 26 on the third edge 22 to the second side 16 of the other of the flaps 26 on the third edge 22. A fastening means 28 also removably fastens the first side 14 of one of the flaps 26 on the fourth edge 24 to the second side 16 of the other of the flaps 26 on the fourth edge 24. The fastening means 28 preferably comprises a hook and loop fastening means.

A pair of non-slip strips 30 are each attached to the second side 16 of the panel 12. Each of the strips 60 is positioned adjacent to one of the first 18 and second 20 edges of the panel 12. Each of the non-slip strips 30 preferably comprises an elastomeric material.

A securing means 32 removably secures the first side 14 of the panel 12 to a chair 70. The securing means 32 preferably includes a hook and loop securing means. The securing means 32 on the panel 12 is preferably positioned nearer the first edge 18 than the second edge 20.

In use, the second side 16 of the panel 12 is positioned on the head 72 such that the first edge 18 is positioned generally adjacent to a base 74 of the head 72. The non-slip strips 30 help to keep the panel on the head 72, one being positioned on the neck and the other on the forehead. The flaps 26 on the third edge 22 are fastened together and the flaps 26 on the fourth edge 24 are fastened together. The first side 14 of the panel is then secured to the chair 70.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of supporting a head of a person in a generally upright position against a chair, said method comprising the steps of:

providing a panel having a first side and a second side, said panel comprising a flexible material, said panel having a first edge, a second edge, a third edge, and a fourth edge wherein said first and second edges are positioned opposite of each other, said third and fourth edges extending outward at a juncture of said third and fourth edges and said first and second edges such that four flaps are defined;

providing a fastening means for removably fastening said first side of one of said flaps on said third edge to said second side of the other of said flaps on said third edge, and providing a fastening means for removably fastening said first side of one of said flaps on said fourth edge to said second side of the other of said flaps on said fourth edge;

providing a securing means for removably securing said first side of said panel to the chair;

positioning said second side of said panel on the head such that said first edge is positioned generally adjacent to a base of the head;

fastening together said flaps together on said third edge and fastening together said flaps together on said fourth edge; and securing said first side of said panel to said chair.

2. The method of supporting a head of a person in a generally upright position against a chair as in claim 1, further including the step of, providing a pair of non-slip strips each attached to said second side of said panel, each of said strips being positioned adjacent to one of said first and second edges of said panel.

3. A method of supporting a head of a person in a generally upright position against a chair, said method comprising the steps of:

providing a panel having a first side and a second side, said panel comprising a flexible material, said panel having a first edge, a second edge, a third edge, and a fourth edge wherein said first and second edges are positioned opposite of each other, said third and fourth edges extending outward at a juncture of said third and fourth edges and said first and second edges such that four flaps are defined, each of said third and fourth edges being arcuate and extending away from each other, said panel comprising a cloth material;

providing a fastening means for removably fastening said first side of one of said flaps on said third edge to said second side of the other of said flaps on said third edge, and providing a fastening means for removably fastening said first side of one of said flaps on said fourth edge to said second side of the other of said flaps on said fourth edge, said fastening means comprising a hook and loop fastening means;

providing a pair of non-slip strips each attached to said second side of said panel, each of said strips being positioned adjacent to one of said first and second edges of said panel, each of said non-slip strips comprising an elastomeric material;

providing a securing means for removably securing said first side of said panel to the chair, said securing means including a hook and loop securing means;

positioning said second side of said panel on the head such that said first edge is positioned generally adjacent to a base of the head;

fastening together said flaps together on said third edge and fastening together said flaps together on said fourth edge; and securing said first side of said panel to said chair.

4. A head support device for supporting the head of a person in a generally upright position against a chair, said device comprising:

a panel having a first side and a second side, said panel comprising a flexible material, said panel having a first edge, a second edge, a third edge, and a fourth edge wherein said first and second edges are positioned opposite of each other, said third and fourth edges extending outward at a juncture of said third and fourth edges and said first and second edges such that four flaps are defined;

a fastening means for removably fastening said first side of one of said flaps on said third edge to said second side of the other of said flaps on said third edge, and providing a fastening means for removably fastening said first side of one of said flaps on said fourth edge to said second side of the other of said flaps on said fourth edge; and a securing means for removably securing said first side of said panel to the chair.

5. The head support device as in claim 4, wherein each of said third and fourth edges are arcuate and extend away from each other.

6. The head support device as in claim 4, wherein said fastening means comprises a hook and loop fastening means.

7. The head support device as in claim 4, further including a pair of non-slip strips each attached to said second side of said panel, each of said strips being positioned adjacent to one of said first and second edges of said panel.

8. The head support device as in claim 7, wherein each of said non-slip strips comprises an elastomeric material.

* * * * *